2,708,166

PROCESS FOR THE FLOCCULATION OF COLLOIDS IN CHEDDAR CHEESE WHEY

Leon Tumerman, Islip, Herbert Silvestri, Peckville, and Carroll Burke, Bayport, N. Y., assignors to National Dairy Research Laboratories, Inc., Oakdale, Islip, N. Y., a corporation of Delaware No Drawing. Application August 9, 1952,
Serial No. 303,607

14 Claims. (Cl. 99—57)

This invention relates to a process for the flocculation of colloids in cheddar cheese whey and more particularly to a process for the production of lactose from cheddar cheese whey in which the flocculation of colloids is an important step.

Casein whey has been used almost exclusively as a source of lactose in this country because of the comparative ease of processing. Recently, however, demands for lactose have exceeded the amounts that can be provided by the processing of casein whey, and it has been necessary to turn to other lactose-containing wheys to supplement the supply.

Cheddar cheese whey affords a large potential source of lactose but this source has not been more extensively utilized because of the difficulties of separating the lactose from the whey. The colloids contained in cheddar cheese whey are quite resistant to flocculation for reasons which have not been fully elucidated. The residual colloids not fully separated by the available processes have prevented filtration and suppress the formation of lactose crystals in a size sufficiently large to permit efficient recovery. Poor yields of lactose contaminated with foreign materials have resulted.

The colloids in cheddar cheese whey are not susceptible to as complete a flocculation by the addition of lime, as in the case of casein whey. The colloid material flocculates very poorly and the resulting turbid solution is very difficult to filter.

Flocculating agents such as bentonite, tannic acid, aluminum oxide, aluminum sulphate, aluminum silicate and ferrous sulfate have been used, but these have not led to a complete separation of the colloids from the whey. Moreover, their presence has prevented the recovery of the flocculated protein as a by-product of the process, which is undesirable, inasmuch as these colloids, consisting predominantly of proteinaceous materials, have a ready market as an animal feed component or supplement, among other uses.

In accordance with the instant invention the colloidal material in cheddar cheese whey is flocculated by heating the whey in the presence of sulfur dioxide to a temperature at which flocculation occurs. The sulfur dioxide assists materially in rendering the whey protein colloids which interfere with lactose crystallization susceptible to flocculation during heat denaturation and the whey so processed is marketed with an unusual clarity. The protein floc settles readily and can be removed by filtration. Thereafter lactose contained in the whey can be recovered in good yield and a high state of purity.

The amount of sulfur dioxide which should be present to effect the desired colloid flocculation is not critical. An amount should be used which will effect a substantially complete flocculation of colloids inhibiting lactose crystallization and produce a clear or only slightly turbid solution from which the floc is readily separated by filtration. Experience has shown that at least 0.02% sulfur dioxide based on the weight of the whey should be present. Amounts as high as 0.2% of sulfur dioxide have been used with excellent results.

However, there is no reason to use more than is necessary to achieve the desired flocculation. Surprisingly, it has been found that amounts of sulfur dioxide in excess of 1% will inhibit a complete flocculation of the undesirable colloids, producing a very turbid whey from which lactose does not crystallize in large crystals, and amounts in excess of 1%, therefore, would not be used. Taking into consideration the desirability of using only the minimum amount while achieving the desired result, 0.05% sulfur dioxide is preferred.

Also of importance in the flocculation is the pH of the whey. The desired flocculation is obtained at a pH within the range of 3.5 to 4.5, with the optimum pH in the range of 3.8 to 4.2. Inasmuch as cheddar cheese whey has a pH of 5 to 6.2, it may be necessary to adjust the pH to within the ranges stated by the addition of a suitable inorganic acid such as hydrochloric, sulfuric or phosphoric acids. Organic acids of sufficiently high strength such as acetic, also can be used.

The sulfur dioxide can be added to the whey as sulfur dioxide gas (in gaseous or solution form) or, more conveniently, liberated in situ from a compound which liberates sulfur dioxide in acid solution. As those skilled in the art are aware, metal sulfites (including the bisulfites), hydrosulfites and metabisulfites as a class meet this requirement. The sulfite, hydrosulfite or metabisulfite should, of course, be soluble in the whey and for this reason the alkali metal sulfites, hydrosulfites, bisulfites and metabisulfites and the alkaline earth metal bisulfites are preferred, such as sodium sulfite, $Na_2SO_3$, sodium hydrosulfite, $Na_2S_2O_4$, sodium bisulfite, $NaHSO_3$, potassium metabisulfite, $K_2S_2O_5$, potassium sulfite, $K_2SO_3$, potassium bisulfite, $KHSO_3$, sodium metabisulfite, $Na_2S_2O_5$, calcium bisulfite, $Ca(HSO_3)_2$, strontium bisulfite, $Sr(HSO_3)_2$, and barium bisulfite, $Ba(HSO_3)_2$. Of these, sodium bisulfite is preferred by reason of its low cost and ready availability, and thus is used in most of the illustrative examples which follow. However, other sulfites, hydrosulfites and metabisulfites can be used including calcium, magnesium, ammonium, strontium and barium sulfites, hydrosulfites and metabisulfites. Hydrosulfites are also known as hyposulfites.

In all instances, an amount of solid compound capable of liberating sulfur dioxide is used sufficient to liberate sulfur dioxide in the whey solution in the amounts specified above.

The adjustment of the pH of the whey and the addition of sulfur dioxide can be effected simultaneously or in either order, the order of these operations not being critical in any way.

After a favorable sulfur dioxide content and pH environment have been ensured, the whey is heated to a temperature at which flocculation of the colloids occurs. It has been found that flocculation will begin at about 180° F. but the whey can be heated to the boiling point of 212° F. if desired. Heating can conveniently be effected by direct steam injection or by heating in a suitable vessel or other well-known means.

The floc formed during the heat denaturation then is allowed to settle and can be removed by filtration. The floc settles slowly, however, and under some circumstances it may be desirable to expedite the settling. This can be done by adding a floc firming agent such as, barium carbonate or calcium carbonate. The calcium carbonate appears to exert a weighing down effect upon the floc and throws down the floc more rapidly. From 0.2% to 0.8% by weight of calcium carbonate has been found to give good results in most cases, but obviously this amount is not critical and will depend upon the volume of floc in the denatured whey.

Due to the acidity of the denatured whey, considerable amounts of carbon dioxide may be evolved upon addition of a carbonate and, therefore, caution should be exercised. It might be desirable to employ an antifoaming agent to suppress foam. It will be appreciated that when a floc firming agent is added the protein floc will be diluted with the same and its value as a by-product of the flocculation process is thereby depreciated. Thus, where recovery of a valuable by-product is important it would not be desirable to employ a floc firming agent.

From the denatured whey solution obtained after separation of the floc lactose can be recovered by concentration and crystallization. Such a lactose is of a high degree of purity, of the order of 90 to 98% lactose, the remainder primarily being ash, largely phosphates, and protein. To obtain a lactose having a lower protein content, a second flocculating operation can be carried out on the denatured whey.

This second flocculation is effected at a pH within the range from 6.0 to 7.0, preferably approximately 6.8. The pH can be brought to within this range by addition of a base, preferably one of a metal whose phosphate is insoluble to reduce ash content as well as protein. Thus, any alkali metal or alkaline earth metal hydroxide or oxide can be used, but alkaline earth metal oxides and hydroxides would be preferred. Lime $(Ca(OH)_2)$ is preferred for its availability and low cost. Other bases which can be used include barium oxide and hydroxide, strontium oxide and hydroxide, and sodium and potassium hydroxides.

Thereupon the whey is again heated to a temperature at which flocculation occurs. This temperature is not critical. Flocculation will begin at approximately 180° F. but temperatures as high as the boiling point may be used, if desired.

Following the second flocculation step a lactose ranging upwards of 98% lactose is obtained. The protein content is reduced from approximately 2% to approximately 0.2%. If a base is used whose phosphate is insoluble, the ash content also is reduced from approximately 3% to approximately 0.75%.

It should be noted that the colloidal material which tends to inhibit crystallization of lactose from cheddar cheese whey is removed in the first flocculation in the presence of sulfur dioxide, and it is not necessary to remove more protein than this to recover a desirable lactose product. The second flocculation step merely effects a further removal of proteinaceous colloidal material to give a higher grade of lactose. If no second flocculation is employed, a further flocculation may occur in the initial stage of condensation, as will be seen later.

Lactose can be recovered from the denatured whey after the first or second flocculation steps by condensing the whey to a solids content at which the lactose will crystallize. The condensation is preferably carried out under a vacuum, inasmuch as browning of the lactose is increased, the higher the temperature at which the condensation is carried out, and conditions permitting use of the lowest possible temperature are therefore preferred. Temperatures within the range of 115 to 160° F. are indicated as satisfactory. The condensation temperature will increase during condensation, with increase in solids content, so that it might be desirable to increase the vacuum drawn upon the material during condensation.

The pH of the denatured whey is of some importance during condensation. The whey should be at an acid pH, i. e. below 7.0, to avoid charring the sugar. If the denatured whey contains appreciable amounts of calcium (as would result, for example, if the whey had been treated with calcium carbonate as a floc firming agent, or with lime in a second flocculation operation) then it would be desirable to effect condensation at a pH of approximately 4 or below, to avoid precipitation of calcium lactate. A precipitate of calcium lactate tends to inhibit lactose crystallization, but if calcium lactate does not precipitate, lactose will crystallize readily in large crystals.

Condensation of the whey would be carried out to a solids content of approximately 55 to 60%. It will be appreciated that the higher the solids content, the more complete a crystallization of lactose will be had. Thus, condensation to approximately 60% solids would usually be preferred. Condensation can be divided into two or more stages if desired, particularly if a second flocculation has not been carried out, for flocculation of colloid may occur in the initial stage of condensation, and such floc should be removed before the liquor becomes too concentrated and viscous.

Crystallization is effected by cooling the liquor, as in a rotating crystallizer. The crystals can be separated by conventional means such as centrifuging or filtration.

The following examples are illustrative:

*Example I*

Into 10 gallons of fresh cheddar cheese whey having a pH of 6.0 sulfur dioxide was bubbled until the whey contained 0.06% of sulfur dioxide. Hydrochloric acid then was added in an amount to adjust the pH to 4.0, after which the whey was heated to the boiling point by injection of steam. After flocculation seemed complete, the boiling was halted and the floc allowed to settle while the whey cooled, for a total settling time of two hours. The floc was removed by decantation and filtration.

From the filtrate lactose was recovered by the following procedure:

The denatured whey first was condensed to a solids content of approximately 30% lactose by heating to 115° F. under a vacuum of 28 inches. The condensed liquor was allowed to stand overnight at a temperature of 135° F. and then filtered to remove floc which formed. The filtrate was further condensed at a temperature of approximately 130° F. to 140° F. under a vacuum of 24 inches and then allowed to cool to room temperature. The pH of the liquor remained at 4.0. Large lactose crystals formed which were easily separated from the clear supernatant liquor, were removed by filtration, fully washed and dried.

The crude lactose obtained was of good quality, approximating 93% lactose.

*Example II*

Example I was repeated except that 0.1% sodium bisulfite (0.06% $SO_2$) was added instead of gaseous sulfur dioxide. The lactose obtained had the analysis:

| | Per cent |
|---|---|
| Lactose | 93.0 |
| Protein | 3.14 |
| Ash | 0.75 |
| Total solids | 98.7 |

*Example III*

Example I was repeated except that sodium sulfite was used instead of sulfur dioxide, in an amount to liberate 0.2% sulfur dioxide in the whey. A crude lactose approximating 93% lactose was obtained.

*Example IV*

Example I was repeated except that potassium metabisulfite in an amount sufficient to yield 0.02% sulfur dioxide was used instead of sulfur dioxide. A crude lactose approximating 90% lactose was obtained.

*Example V*

To 4,000 gallons of fresh cheddar cheese whey having a pH of 6.0 was added 0.1% by weight of sodium bisulfite. Hydrochloric acid then was added to the whey to adjust the pH to 4.0 and the whey was heated by injection of steam to the boiling point. The boiling was continued until the flocculation seemed complete, whereupon the denatured liquor was allowed to cool. After two hours the floc had fully settled and was separated by decantation and filtration.

In order to remove additional protein and precipitate phosphate salts, sufficient calcium hydroxide was added to adjust the pH to 6.8 and the liquor again heated to boiling by injection of steam. The boiling was continued until flocculation was complete, whereupon the mixture was permitted to cool and was filtered.

Lactose was removed from the denatured liquor by the following procedure:

The pH was adjusted to 4.0 by addition of hydrochloric acid and the liquor then condensed in a double effect evaporator at a temperature of aproximately 115° F. under 28 inches vacuum to 30% lactose. The condensed liquor was allowed to stand overnight at 135° F. and then filtered to remove floc which had formed. The filtrate was further condensed in the double effect evaporator at a temperature of 135° F. under 24 inches vacuum to 60% lactose and then allowed to cool to room temperature. The pH of the liquor remained at 4.0. Lactose crystals formed upon standing and these were removed by centrifuging, washed and dried.

The crude lactose obtained had the following analysis:

|  | Per cent |
|---|---|
| Lactose | 96.8 |
| Ash | 0.79 |
| Protein | 0.18 |
| Total solids | 98.6 |

*Example VI*

Two batches of cheddar cheese whey, each having an initial pH of 5.0 and a volume of 1730 gallons, were prepared as follows:

Hydrochloric acid (18.5 pounds) was added to each batch to adjust the pH to 4.0, and then 13.8 pounds of sodium bisulfite was added to each batch (0.1% by weight sodium bisulfite). These materials were thoroughly mixed with the whey by injection of steam in just the amount needed to agitate the mixture without heating it. Thereupon the two batches were brought to the boiling point over a 45-minute heating period by injection of steam and then allowed to stand. The final volume of each batch was 2,000 gallons. From this point on the processing of the two batches was carried out separately.

One batch was allowed to stand for one hour. 1,000 gallons was filtered in 70 minutes through 3 filter presses containing 21 frames, each 18 by 18 inches, and each precoated with 50 pounds of dicolite filter aid. The remaining 1,000 gallons was allowed to stand.

The other batch was allowed to stand for two hours and 45 minutes. 1,800 gallons of this batch was passed through three filter presses which contained 21 frames of 18 by 18 inches, each with 50 pounds of dicolite filter aid. Filtration required 80 minutes. 200 gallons of floc-containing sludge was left behind.

800 gallons of the 1000 gallons remaining from the first batch then was filtered through the same filter presses in 25 minutes, leaving behind 200 gallons of floc-containing sludge. The two batches of sludge then were combined and filtered.

In all, 3460 gallons of deproteinated whey was recovered as filtrate. To this was added 2000 gallons of deproteinated whey from the previous batch and this mixed whey was then condensed to 20° Baumé (about 30% lactose) in a double effect evaporator. After standing for a period the mixture was filtered and then condensed in the double effect evaporator at a temperature of approximately 135° F. under a vacuum of 24 inches. The condensed whey then was placed in a rotating crystallizer that rotated not in excess of 1 R. P. M. After 9 hours the crystals were separated, washed and dried. This lactose assayed as follows:

|  | Per cent |
|---|---|
| Lactose | 94.5 |
| Ash | 1.65 |
| Protein | 1.48 |
| Total solids | 97.0 |

The yield was 60% on the basis of 4 pounds of lactose per 100 pounds of whey (2.4 pounds of lactose per 100 pounds of whey were recovered).

*Example VII*

To cheddar cheese whey having a pH of 4.5 was added 0.1% by weight of sodium bisulfite. The pH of the whey then was brought to 4.0 by the addition of hydrochloric acid. The whey was heated to approximately 90° C. by steam injection in a large tank and heating continued until flocculation seemed complete. To the heated whey was added 0.4% by weight of calcium carbonate. The floc settled rapidly and the whey was filtered.

Lactose was recovered by the following process:

The denatured whey was brought to 20° Baumé (approximately 30% lactose) in a triple effect evaporator at a temperature of approximately 115° F. under a vacuum of 28 inches. The concentrated liquor was heated to 160° F. and allowed to settle, after which the temperature was brought to 180° F. Additional floc which formed was removed by filtration.

The filtered thin syrup was concentrated in a single effect evaporator to 34 to 35° Baumé (about 50% lactose) at a temperature of about 135° F. under a vacuum of 24 inches, and poured into a rotating crystallizer. The liquor was cooled for 10 hours with a starting temperature of 68° F. The crystal mass was then fully washed free of mother liquor. A yield of approximately 3.0 pounds of crude lactose per 100 pounds of whey was obtained (approximately 75%, based on a weight of 4.0 pounds of lactose per 100 pounds of starting whey). This crude lactose assayed approximately 95% lactose.

*Example VIII*

Example VII was repeated, except adjusting the pH of the whey before denaturation to 3.5. Deproteination was effected without difficulty, and a crude lactose approximating 95% lactose was obtained.

*Example IX*

Example VII was repeated, except adjusting the pH of the whey before denaturation to 4.5. Good protein flocculation was obtained. The lactose recovered assayed at approximately 93% lactose.

*Example X*

Cheddar cheese whey (2000 gallons) and 2000 gallons of casein whey were mixed, the pH adjusted to 4.0 and 0.1% sodium bisulfite added. The whey was brought to the boiling point by steam injection and boiling continued until flocculation seemed complete. Calcium carbonate (0.8%) was added to assist in settling the curd. The supernatant liquor was separated from the curd by filtration, concentrated to a solids content of approximately 30% lactose at 115° F. under a vacuum of 20 inches, allowed to stand overnight at a temperature of 135° F., filtered to remove floc and further condensed to 60% solids at 130 to 140° F. under a vacuum of 24 inches and allowed to cool. The pH of the liquor remained at 4.0. The large lactose crystals which formed were easily separated by filtration from the clear liquor. The crude lactose obtained was a good quality, approximating 93% lactose.

The process of the invention provides an easy method of removing colloidal material, consisting predominately of protein, from cheddar cheese whey. The flocculation in the presence of sulfur dioxide is effected in such a manner that the floc is easily removed by filtration and a clear filtrate is obtained. This filtrate can be used as such as a source of lactose if desired. The protein obtained by flocculation is a valuable by-product which can be used as a source of protein in animal feed.

If desired, lactose may be removed from the denatured whey by simple condensation and crystallization procedures. However, crystallization should be effected at a pH of approximately 4.0 or below in order to avoid difficulties due to precipitation of calcium lactate, if the whey contains sufficient quantities of calcium and lactic acid.

It has been observed that sulfur dioxide acts as a preservative for cheddar cheese whey and prevents the bacterial conversion of lactose to lactic acid, with development of high acidity and proteolysis, for periods as long as 7 days without refrigeration. Thus, the invention contemplates addition of the sulfur dioxide whose presence is desired in the flocculation operation to the fresh cheddar cheese whey as soon as it is made available. The resulting preserved whey can be shipped for long distances without deterioration. The adjustment of pH to permit a flocculation upon heating can be carried out at a distance from the source of the whey. Such addition of sulfur dioxide in advance of the flocculation operation will not affect the flocculation, provided the amount of sulfur dioxide present in the whey at the time flocculation is effected remains within the concentration set forth heretofore.

The invention is not limited to the treatment of fresh cheddar cheese wheys or to cheddar wheys which have been preserved by addition of sulfur dioxide. Even though deterioration of the protein accompanied by bacterial production of lactic acid has taken place, flocculation can be effected in the presence of sulfur dioxide to produce a readily filtered floc and a clear filtrate. Cheddar cheese wheys having a pH as low as 4.5 have been successfully flocculated in accordance with the invention.

The presence of sulfur dioxide also appears to prevent deteriorative changes in the lactose during processing. In the conventional liming process for the production of lactose from casein whey, dark brown sugar concentrates frequently are obtained due to Maillard type reactions. The process of the instant invention on the other hand produces a crude lactose having a cream or white color. This protection against browning may also be due to the lower pH values at which flocculation is effected.

The process is adapted to commercial utilization of large quantities of cheddar cheese whey for the production of crude lactose of good quality. The process can be carried out in conventional lactose refining plants and compares favorably in cost to the cost of production of lactose from casein whey.

As illustrated in Example X, the invention is also applicable to the processing of mixtures of cheddar cheese whey with casein whey containing cheddar cheese whey in any proportions in which the sulfitation improves the filtration characteristics of the flocculated protein. If limed casein whey is diluted with a cheddar cheese whey which has been sulfited according to the invention and then further processed by condensation to recover lactose, browning of the lactose is prevented to a large extent.

All parts and percentages of the specification are by weight.

We claim:

1. A process for flocculating colloidal proteinaceous materials in cheddar cheese whey and mixtures thereof with casein whey which comprises heating the whey in the presence of not over approximately 1% sulfur dioxide at a pH within the range from about 3.5 to about 4.5 to a temperature at which flocculation occurs.

2. A process in accordance with claim 1 in which the sulfur dioxide is added in the form of $SO_2$ gas.

3. A process in accordance with claim 1 in which the sulfur dioxide is added in the form of a substance capable of liberating sulfur dioxide in acid solution.

4. A process in accordance with claim 3 in which the material is a sulfite.

5. A process in accordance with claim 3 in which the material is a bisulfite.

6. A process in accordance with claim 3 in which the material is a metabisulfite.

7. A process in accordance with claim 1 in which the whey is heated to a temperature at least 180° F.

8. A process in accordance with claim 1 which includes adding a floc firming agent to the heated liquor to facilitate settling of the floc.

9. A process for the production of lactose from cheddar cheese whey and mixtures thereof with casein whey which comprises heating the whey in the presence of not over approximately 1% sulfur dioxide at a pH within the range from about 3.5 to about 4.5 to a temperature at which flocculation occurs, separating floc from the whey and recovering lactose from the residual liquor.

10. A process for the production of lactose from cheddar cheese whey and mixtures thereof with casein whey which comprises heating the whey in the presence of not over approximately 1% by weight of sulfur dioxide at a pH within the range from about 3.5 to about 4.5 to a temperature at which flocculation occurs, separating floc from the whey, concentrating the residual liquor to a solids content at which lactose crystallizes and effecting crystallization of lactose.

11. A process for flocculating colloidal proteinaceous materials in cheddar cheese whey and mixtures thereof with casein whey which comprises heating the whey in the presence of not over approximately 1% of sulfur dioxide at a pH within the range from about 3.5 to about 4.5 to a temperature at which flocculation occurs, adjusting the pH of the whey to within the range from about 6.0 to about 7.0 and heating the whey to a temperature at which a further flocculation occurs.

12. A process in accordance with claim 1 in which the pH is adjusted by the addition of calcium hydroxide.

13. A process for the production of lactose from cheddar cheese whey and mixtures thereof with casein whey which comprises heating the whey in the presence of not over approximately 1% by weight of sulfur dioxide at a pH within the range from about 3.5 to about 4.5 to a temperature at which flocculation occurs, adjusting the pH of the whey to within the range from about 6.0 to about 7.0, heating the whey to a temperature at which a further flocculation occurs, separating the floc and then recovering lactose from the liquor.

14. A process for the production of lactose from cheddar cheese whey and mixtures thereof with casein whey which comprises heating the whey in the presence of not over approximately 1% by weight of sulfur dioxide at a pH within the range from about 3.5 to about 4.5 to a temperature at which flocculation occurs, adjusting the pH of the whey to within the range from about 6.0 to about 7.0, heating the whey to a temperature at which a further flocculation occurs, separating the floc, concentrating the liquor to a solids content at which lactose crystallizes and effecting crystallization of the lactose at a pH of approximately 4.0.

References Cited in the file of this patent

UNITED STATES PATENTS

| | | |
|---|---|---|
| 911,269 | Reuter | Feb. 2, 1909 |
| 2,007,962 | Burruss et al. | July 16, 1935 |
| 2,541,441 | Sharp et al. | Feb. 13, 1951 |
| 2,555,213 | Wallace et al. | May 29, 1951 |

FOREIGN PATENTS

| | | |
|---|---|---|
| 135,969 | Great Britain | Dec. 11, 1919 |